United States Patent [19]

Israel et al.

[11] Patent Number: 4,833,182

[45] Date of Patent: May 23, 1989

[54] ISOCYANATE-POLYESTER POLYOL BINDER FOR MANUFACTURE OF CELLULOSIC COMPOSITES

[75] Inventors: Michael G. Israel, Clearwater; George A. Grozdits; Ernest K. Moss, both of St. Petersburg, all of Fla.

[73] Assignee: Jim Walter Research Corp., St. Petersburg, Fla.

[21] Appl. No.: 222,468

[22] Filed: Jul. 21, 1988

Related U.S. Application Data

[63] Continuation-in-part of Ser. No. 912,894, Sep. 29, 1986, abandoned.

[51] Int. Cl.$^4$ .................. B29J 5/00; C08G 18/18; C08L 97/02
[52] U.S. Cl. .......................... 524/14; 524/15; 524/16; 524/35; 524/72; 524/73; 528/80; 528/83; 264/125; 264/136; 156/288; 156/331.4
[58] Field of Search ............... 524/13, 14, 15, 16, 524/35, 72, 73; 527/301, 401, 100, 103; 528/80, 83; 264/125, 122, 123, 136, 109; 156/288; 331.4

[56] References Cited

U.S. PATENT DOCUMENTS

| 3,821,135 | 6/1974 | King | 524/16 |
|---|---|---|---|
| 4,100,328 | 7/1978 | Gallagher | 428/407 |
| 4,143,014 | 3/1979 | McLaughlin et al. | 428/321 |
| 4,209,433 | 6/1980 | Hse | 156/62.2 |
| 4,254,228 | 3/1981 | Kleimann et al. | 521/123 |
| 4,396,673 | 8/1983 | Ball et al. | 428/326 |
| 4,402,896 | 9/1983 | Betzner et al. | 264/115 |
| 4,407,771 | 10/1983 | Betzner et al. | 264/115 |
| 4,431,455 | 2/1984 | Brown et al. | 106/245 |
| 4,451,425 | 5/1984 | Meyer | 264/300 |
| 4,490,517 | 12/1984 | Fuzesi et al. | 527/401 |
| 4,490,518 | 12/1984 | Fuzesi et al. | 527/401 |
| 4,522,975 | 6/1985 | O'Connor et al. | 524/702 |
| 4,528,153 | 7/1985 | Scholl et al. | 264/109 |
| 4,546,039 | 10/1985 | Horacek et al. | 428/357 |
| 4,581,387 | 4/1986 | Werner et al. | 521/128 |
| 4,608,407 | 8/1986 | Kerimis et al. | 524/14 |
| 4,609,513 | 9/1986 | Israel | 264/122 |

FOREIGN PATENT DOCUMENTS 60766 3/1975 Australia .
1653178 11/1970 Fed. Rep. of Germany .

OTHER PUBLICATIONS

Wilson, J. B., "Isocyanate Adhesives as Binders for Composition Board," Adhesives Age, pp. 41–44, May 1981.
Gallagher, J. A., "Urethane bonded particleboard," Forest Products Journal, vol. 32, No. 4, pp. 26–33, Apr. 1982.

*Primary Examiner*—Morton Foelak
*Assistant Examiner*—Nathan M. Nutter
*Attorney, Agent, or Firm*—Charles W. Vanecek

[57] ABSTRACT

A binder for use in the preparation of a synthetic board from cellulosic and/or lignocellulosic material comprising an organic polyisocyanate and a polyester polyol, especially an aromatic polyester polyol.

21 Claims, No Drawings

ISOCYANATE-POLYESTER POLYOL BINDER FOR MANUFACTURE OF CELLULOSIC COMPOSITES

This is a continuation-in-part of Application Ser. No. 912,894, filed Sept. 29, 1986, now abandoned.

BACKGROUND OF THE INVENTION

1. Field of the Invention

This invention relates to an improved process for bonding cellulosic and/or ligno-cellulosic materials in the production of synthetic board products by utilizing a polyester polyol/polyisocyanate binder.

2. Description of the Prior Art

Many board products are manufactured by the basic process of consolidating or joining together bodies of cellulosic and/or ligno-cellulosic materials using pressure, heat and a chemical binder. Typical binders used in making such products are thermosetting resins such as phenol-formaldehyde, resorcinol-formaldehyde, melamine-formaldehyde, urea-formaldehyde, modified lignosulfonates, urea-furfural and condensed furfuryl alcohol resins. Another binder system involves the use of organic polyisocyanates, either alone or in combination with other binder materials, such as urea-or melamine-formaldehyde resins, phenol-formaldehyde resins, lignosulfonates, furfurals, etc.

The use of polyisocyanate binders in the production of board products is subject to the drawbacks that the isocyanates generally are more expensive than the commonly used formaldehyde binder systems, and the boards produced with the isocyanates have a tendency to adhere to the platens used in their formation. This adhesion can damage or even ruin the board product, and the subsequent cleanup of the contaminated platens is difficult, time-consuming and costly.

Various attempts have been made to overcome this adhesion problem without sacrificing other desirable board properties. Conventional release agents such as oils, wax polishes, silicones and polytetrafluoroethylene have been tried and found wanting.

Another approach involves incorporating into organic polyisocyanate-based binders various additives as internal agents to reduce sticking and produce articles of good quality. For example, U.S. Pat. No. 4,100,328 discloses the use of a polyether polyol-organic polyisocyanate binder composition for bonding cellulosic materials and eliminating sticking to mold faces. Unfortunately, in this binder composition a portion of the rather costly isocyanate component is replaced by polyols which themselves are relatively expensive materials.

The use of polyols in general as reactive additives for polyisocyanate binder compositions is disclosed in U.S. Pat. No. 4,546,039, wherein the polyols are used to prepare isocyanate group-containing prepolymer bonding agents. U.S. Pat. No. 4,609,513 also discloses the usefulness in isocyanate binder systems of polyols generally, including the expensive polyether polyols of the Gallagher patent referred to above. This patent further discloses the need for the concomitant incorporation of a fatty acid component to manufacture board products having acceptable properties.

OBJECTS OF THE INVENTION

It is an object of the present invention to provide an improved binder system for use in producing a synthetic board from ligno-cellulosic and/or cellulosic materials by combining an isocyanate with a relatively inexpensive diluent which significantly reduces the overall cost of the system but still contributes to the obtainment of desirable board properties, including superior strenght, moisture resistance and release.

It is a further object of the present invention to provide a simple and economical process for producing a synthetic board product through the use of the improved binder system of the invention, which exhibits superior adhesive characteristics in the board and is particularly effective in minimizing unwanted adhesion to the platens used in producing the board.

It is a still further object of the present invention to provide a synthetic board product, especially a particle board, waferboard, oriented waferboard or oriented strand board, which has a combination of excellent properties, including superior strenght, dimensional stability and durability.

It is another object of the present invention to provide a low density synthetic board product having excellent properties, including superior strenght.

These and other objects and advantages of the present invention will become more apparent to those skilled in the art from the following detailed description.

SUMMARY OF THE INVENTION

The above objects have been achieved in the process of the present invention for forming shaped articles by the hot pressing of a composition of a comminuted organic and/or inorganic raw material utilizing a binder comprising a combination of a polyisocyanate and a polyester polyol. The binder is used preferably for materials containing lignocellulose. The binder system can be used in the production of both interior and exterior grade board products and is especially useful in the manufacture of waferboard, particleboard and oriented strand board.

The polyisocyanate of the binder system may suitably be any organic polyisocyanate compound containing at least 2 active isocyanate groups per molecule, or mixtures of such compounds. Polyphenyl polyisocyanates, such as diphenylmethane-4, 4'-diisocyanate and polymethylene polyphenyl polyisocyanates, are particularly suitable.

Employed in conjunction with the polyisocyanate are suitable polyesters containing hydroxyl groups, which include, for example, reaction products of polyhydric alcohols with polybasic carboxylic acids. The alcohols and/or the acids may, of course, be used as mixtures of two or more compounds in the preparation of the polyester polyols.

A preferred binder of the invention comprises a polyisocyanate, particularly a polymethylene polyphenyl polyisocyanate, and a polyester polyol, with the proviso that said binder does not contain any fatty acid material.

The polyester polyols of the present binder system generally have hydroxyl numbers ranging from about 100 to 700, preferably from about 100 to 400, and have an average functionality of from about 1 to 8, more preferably from about 2 to 3, and most preferably about 2.

In a particularly preferred embodiment of the invention, the binder system comprises a polyisocyanate and an aromatic polyester polyol. The aromatic polyester polyols advantageously contain at least two hydroxyl groups and generally have a molecular weight of from about 150 to 5,000. Preferably, these polyester contain from 2 to 8 hydroxyl groups and have a molecular weight of from about 220 to 800, more preferably from about 270 to 400. The acid component of these polyesters preferably comprises at least 40% by weight of phthalic acid residues. By phthalic acid residue is meant the group

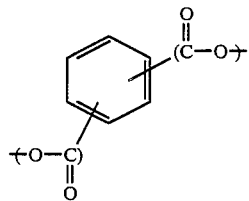

Particularly suitable compositions containing phthalic acid residues for use in the invention are (a) ester-containing by-products from the manufacture of dimethyl terephthalate, (b) scrap polyalkylene terephthalates, and (c) phthalic anhydride residues.

If desired, other conventional binding agents, such as formaldehyde condensate adhesive resins, may be used in conjunction with the present binder system.

DETAILED DESCRIPTION OF THE INVENTION

The method of the present invention is suitable for processing cellulosic starting materials in general, and is particularly useful for forming wood particles into board products. Mixtures of cellulosic particles may be used. Typically, such materials are wood particles derived from wood and wood residues such as wood chips, wood fibers, shavings, veneers, wood wool, cork, bark, sawdust, and the like. Particles of other cellulosic material such as shredded paper, pulp or vegetable fibers such as corn stalks, straw, bagasse and the like, and of non-cellulosic materials such as shredded scrap rubber, polyurethane, polyisocyanurate and like cellular and non-cellular polymers can also be used. Inorganic materials such as hydrated alumina, gypsum, chopped mineral fibers and the like can also be employed, either alone or in combination with any of the above cellulosic or non-cellulosic materials, in the formation of boards in accordance with the present invention.

The board is produced according to the process of the invention by bonding together particles of wood or other cellulosic material using heat, pressure and the binder system of the invention. The invention particularly relates to a process of preparing synthetic boards wherein cellulosic material is contacted with an improved binder and the treated material is subsequently formed into boards by the application of heat and pressure, the improved binder comprising an organic polyisocyanate and a polyester polyol. While the process is particularly suitable for the manufacture of waferboard, oriented waferboard, particleboard, and oriented strand board, it is not limited in this respect and can also be used in the manufacture of medium density fiberboard, plywood, etc.

The process of the invention can be utilized in the production of multi-layered synthetic boards wherein the surface layers are bonded with conventional resins (e.g., urea-formaldehyde, melamine-formaldehyde, phenol-formaldehyde), and the core is bonded by the isocyanate/polyester polyol of the invention.

As mentioned above, the binder system may suitably contain any organic polyisocyanate containing two or more isocyanate groups. The polyisocyanates which may be employed include the aliphatic, cycloaliphatic and aromatic polyisocyanates, and combinations thereof. Representative of these types are the following: m- and p-phenylene diisocyanates, toluene-2,4- and 2,6-diisocyanates, diphenylmethane-4,4-diisocyanate, 4-chloro-1,3-phenylene diisocyanate, napthalene-1,5-diisocyanate, diphenylene-4,4-diisocyanate, 3,3'-dimethyl diphenylmethane-4,4'-diisocyanate, 3-methyl-diphenylmethane-4,4'-diisocyanate, diphenylether diisocyanate, cyclohexane-2,4- and 2,3-diisocyanates, 1-methyl cyclohexyl-2,4- and 2,6-diisocyanates, bis-(isocyanatocyclohexyl-) methane, 2,4,6-triisocyanatotoluene, 2,4,4-triisocyanatodiphenyl ether, poly methylene polyphenyl polyisocyanates, methylene diphenyl diisocyanate, triphenylmethane triisocyanate, 3,3'-ditolylene-4,4-diisocyanate, 4,4'-methylenebis (2methyl-phenyl isocyanate), hexamethylene diisocyanate, and cyclohexylene-1,3-and 1,2-diisocyanates. Preferred polyisocyanates are polymethylene polyphenyl polyisocyanates.

In the production of the polyester polyols of the binder system, the corresponding polycarboxylic acid anhydrides or corresponding polycarboxylic acid esters or mixtures thereof may be used for the production of the polyesters instead of the free polycarboxylic acids. The polycarboxylic acids may be aliphatic, cycloaliphatic, aromatic and/or heterocyclic and may optionally be substituted, for example, by halogen atoms, and-/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis-glycol ester.

Any suitable polyhydric alcohol may be used in preparing the polyester polyols. The polyols may be aliphatic, cycloaliphatic, aromatic and/or heterocyclic, and are preferably selected from the group consisting of diols and triols. Low molecular weight polyols such as aliphatic dihydric alcohols having from 2 to 16 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used. Moreover, the polycarboxylic acid(s) may be condensed with a mixture of polyhydric alcohols and amino alcohols.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinitol; mannitol; sorbitol; formitol; α-methyl-glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are oxyalkylene glycols, such as diethylene glycol, dipropylene glycol, triethylene glycol, tripropylene glycol, tetraethylene glycol, tetrapropylene glycol, trimethylene glycol and tetramethylene glycol.

The preferred aromatic polyester polyols of the invention include, for example, reaction products of polyhydric, preferably dihydric and optionally trihydric and higher functionality alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. O-phthalic acids, isophthalic acids and/or terephthalic acids may be used as the phthalic acid. The polyhydric alcohols and the optional polybasic-carboxylic acids may be any of those referred to above as suitable for the preparation of the polyester polyols of the invention. The aromatic polyester polyols of the binder should contain a sufficient amount of the above-defined phthalic acid residues to improve the properties of the synthetic board, especially the board strenght and dimensional stability, i.e., to enhance the board properties to above the values the board would have if the polyester polyol were replaced by a polyether polyol of substantially the same functionality and equivalent weight.

Other conventional polyols such as polyether polyols may be used in minor amounts in the binder composition of the invention. Minor amount of these polyol additives may be defined as amounts which do not detract from the enhanced board properties stemming from use of the polyester polyols, especially the aromatic polyester polyols. The polyester polyols of the invention preferably comprise at least about 65–100 weight %, and more preferably about 85–100 weight % of the polyol component of the binder composition.

While the polyester polyols can be prepared from substantially pure reactant materials, more complex ingredients may be used, such as side-stream, waste or scrap residues from the manufacture of phthalic acid, terephthalic acid, dimethyl terephthalate, polyethylene terephthalate, adipic acid and the like. Suitable polyol side-stream sources include ethylene glycol, diethylene glycol, di- and triethylene glycol and higher homologs. The similar homologous series of propylene glycols can also be used. The aromatic and/or aliphatic polyester polyols thus obtained from low cost raw materials offset the cost premium for isocyanate versus phenol-or-urea-formaldehyde binder systems. Polyester polyols derived from raw materials containing compounds having the above defined phthalic acid residues constitute a preferred binder component of the invention.

The polyols of the binder composition suitably contain a sufficient amount of primary (1°) hydroxyl groups for enhanced board properties (e.g., board strenght and durability). The presence of such groups is readily brought about by using in the preparation of the polyester polyols alcohols containing the groups, such as glycols like diethylene glycol, triethylene glycol, higher homologs, and mixtures thereof, and optionally their mixtures with at least one other primary hydroxyl group-containing alcohol.

The polyester polyols of the invention generally contain about 0 to 35% excess unreacted polyol starting material and have an acid number less than 10. These polyester polyols advantageously comprise (a) about 65 to 100%, preferably 85 to 100%, by weight, of polyester polyol (especially aromatic polyester polyol), (b) about 0 to 35%, preferably 0 to 15%, by weight, of an alkylene glycol having the formula

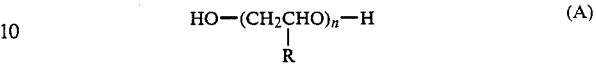

where R is hydrogen or lower alkyl of one to four carbon atoms and n is from 1 to 10, preferably 1 to 3, and more preferably 2 to 3, and (c) about 0 to 35%, preferably 0 to 15%, by weight, of at least one other polyol (e.g., a polyol of functionality greater than 2).

Alkylene glycols of formula (A) are especially useful in the transesterification and digestion of dimethyl terephthalate residues, PET scrap, phthalic anhydride bottoms, crude or light ends compositions, and the like. Additional glycol may be added after the transesterification and digestion procedures for appropriate adjustment of the equivalent weight. Examples of the alkylene glycols are ethylene glycol, propylene glycol, diethylene glycol, dipropylene glycol, triethylene glycol, tripropylene glycol and tetrapropylene glycol, among others, and mixtures thereof. Especially suitable glycols are diethylene and triethylene glycols. The term "polyester polyol" as used in this specification and claims thus includes any minor amounts of unreacted polyol remaining after the preparation of the polyester polyol and/or unesterified polyol added after the preparation.

A preferred hydroxy terminated aromatic polyester for use in the present invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, and suitable transesterified polyol mixtures are described in U.S. Pat. No. 4,237,238, the disclosures of which patents are hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Delaware under the trade name of Terate$^{200}$ resins.

An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

Another preferred aromatic polyester polyol which can be employed is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An especially useful polyol mixture can be prepared by transesterifying a by-product fraction from the manufacture of dimethyl terephthalate comprising a mixture of:

(a) about 40 to 60 percent by weight of dimethyl terephthalate, (b) about 1 to 10 percent by weight of monomethyl terephthalate, (c) about 1 to 2 percent by weight of terephthalic acid, (d) about 10 to 25 percent by weight of bi-ring esters, (e) about 5 to 12 percent by weight of organic acid salts, (f) about 18 to 25 percent by weight of polymeric materials, and (g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. The properties of the polyol mixture produced by the transesterification are described in U.S. Pat. No. 4,411,949, the disclosure of which is hreby incorporated by reference. Examples of this transesterified by-product fraction of the invention are the products supplied by Sloss Industries Corporation under the trademark Foamol.

Still other preferred aromatic polyester polyols are those produced by digesting polyalkylene terephthalate, especially polyethylene terephthalate (PET), residues or scraps with organic polyols, such as the digestion products disclosed in U.S. Pat. Nos. 4,223,068, 4,417,001, 4,469,824, 4,529,744 and 4,604,410 and European Patent Applications Nos. 83 102510.1 and 84 304687.1.

Especially preferred are those polyols prepared by digesting polyalkylene terephthalate polymers with a polycarboxylic acid component-containing polyol derived from a digesting polycarboxylic acid component and a digesting polyol component. Advantageously, the polycarboxylic acid component has ring units with two

groups on adjacent (or ortho) or alternate (or meta) ring positions. Examples of suitable polycarboxylic acid components are phthalic anhydride, phthalic acid, isophthalic acid, trimellitic anhydride, trimellitic acid, benzophenonetetracarboxylic dianhydride, esters of these polycarboxylic acid components and mixtures thereof. Suitable digesting polyol components include glycols, such as diethylene glycol, dipropylene glycol, mixtures of these glycols and their mixtures with at least one other oxyalkylene glycol.

When PET is digested by the polycarboxylic acid component-containing polyol, it has been found advantageous to distill from the resultant digested polyol mixture sufficient ethylene glycol liberated in the digestion to improve the storage stability of the mixture. The polycarboxylic acid component-containing polyol preferably includes at least one glycol which is co-distillable with the liberated ethylene glycol, and the distillation is conducted to distill from the digested polyol mixture the amount of liberated ethylene glycol and co-distillable glycol sufficient for improved storage stability of the mixture. The distillation advantageously is conducted rapidly at reduced temperature and pressure to prevent or minimize the liberation of further ethylene glycol from the polyethylene terephthalate during the distillation. A most preferred distilled polyol mixture is prepared with a digesting medium derived from phthalic anhydride and diethylene glycol, and is characterized by an equivalent weight of 100-250 grams/equivalent of OH, a low free ethylene glycol content, e.g., less than 1%, preferably less than 0.5%, by weight, and a free diethylene glycol level in the 3 to 30 weight % range.

U.S. Pat. No. 4,549,341 and Patent Application Ser. No. 756,107 describe the preparation and properties of preferred digestion and distillation products obtained through use of the polycarboxylic acid component-containing digesting medium. The disclosures of this patent and application are hereby incorporated by reference.

Still another desirable aromatic polyester polyol is prepared by (a) transesterification, with the aforesaid polycarboxylic acid component-containing polyol, of the residue remaining after dimethyl terephthalate and methyl p-toluate have been removed from the product of oxidation of p-xylene in the preparation of dimethyl terephthalate, or (b) esterification, with the polycarboxylic acid component-containing polyol, of a carboxyl functional residue resulting from the removal of terephthalic acid from the mixture obtained by the oxidation of p-xylene in the preparation of terephthalic acid.

The preparation and properties of this polyester polyol are described in U.S. Patent Application Ser. No. 797,303, the disclosure of which is hereby incorporated by reference.

In the binder composition of the invention, the equivalent ratio or binder index of polyisocyanate to polyol is generally about 10:1 to 2:1, preferably 8:1 to 3:1. The quantity of binder needed in a particular board-forming process can be determined by simple experimentation. An application of from about 0.5 to 25%, preferably 1.5 to 9% of total binder composition, solids basis, may generally be employed. If desired, other standard materials, such as fire retardants, pigments, catalysts, additional internal release agents, water-repellants (e.g., sizing agents), etc., may also be applied.

The process of the invention is readily carried out by applying the organic polyisocyanate and polyester polyol to the wood particles in any suitable manner, such as by spraying, and then subjecting the treated material to heat and pressure. Before the compression molding step, the wood particles and binder are desirably blended together in a suitable mixing machine, e.g., a rotary blender. The board formation is suitably accomplished in a heated press between caul plates. The binder composition of the invention is suitably applied to moist wood particles which are generally at a moisture content of about 3-25%, and preferably of about 5-10%, based on the dry weight of the wood particles. The polyester polyol component may be applied before, simultaneously with, or after the polyisocyanate. The polyisocyanate and polyester polyol components may advantageously be premixed immediately or fairly close in time before their application to the wood particles. This simplifies application and avoids excessive viscosity buildup. In a preferred embodiment of the invention, the polyester polyol is applied after the polyisocyanate.

Although the polyester polyol and polyisocyanate components may be applied in the form of a solution or dispersion, the components preferably are applied neat. Pressing times, temperatures and pressures vary widely depending on the thickness of the board produced, the desired density of the board, the size and type of the particles used, and other factors well known in the art.

The above-described process can be carried out batch-wise or in a continuous manner. It is also within the scope of the invention to apply a release agent to the metal surfaces of the press before a manufacturing run is commenced, if desired. This may aid in insuring that minimal adherence of the board to the metal surfaces takes place. Any material known to those in the art as being suitable as a release agent may be employed, e.g., iron, calcium or zinc stearate compounds.

The binder composition of the present invention may also be used in conjunction with conventional theremosetting resin binders, such as phenol-formaldehyde, resorcinol-formaldehyde, melamine-formaldehyde, urea-formaldehyde, urea-furfural, and the like. Other modifications should be readily apparent to those skilled in the art.

A preferred embodiment of the invention involves the blow line addition of the binder composition in manufacturing board products. Procedures and equipment for this type of application are described in U.S. Pat. Nos. 4,402,896, 4,407,771 and 4,533,436, the disclosures of which are hereby incorporated by reference.

More detailed descriptions of methods of manufacturing lignocellulosic composites of the invention, such as medium density fiberboards, hardboards, particleboards, flakeboards, waferboards, oriented strand boards, oriented waferboards, and lumber or timber shaped composites, are available in the prior art. The techniques and equipment conventionally used can be adapted for use with the compositions of the invention.

The binder compositions of the invention are effective in minimizing unwanted adhesion during board formation, and the lignocellulosic composite materials produced have superior physical properties, including improved strength and dimensional stability (i.e., low thickness swell), and may be used in any of the situations where such articles are customarily employed.

plary strength over a broad range of board densities, its superior adhesive characteristics are especially evident in lower density board products, such as those of 44 pcf (70 kg/m$^3$) density and lower, more particularly those whose density is less than about 40 pcf (64 kg/m$^3$). These lower density boards of the invention are found to be superior in strength to comparable boards bonded with straight organic polyisocyanates.

The invention is further illustrated by the following examples in which all parts and percentages are by weight unless otherwise indicated.

EXAMPLE 1

This example illustrates the production of waferboards using as the binder various polyisocyanate/polyol compositions. Mondur MR, a commercial polymethylene polyphenyl isocyanate available from Mobay Chemical Corporation, was used as the isocyanate in combination with the polyester and polyether polyols of the following Table I.

A. Preparation of Waferboard

Wafer furnish was rotated in a rotary blender and treated sequentially by spray application of isocyanate first followed by the polyol component. The binder level was 1.5% for each face of the waferboard and 2% for the core for an overall binder content of 1.75%. Each component addition required about 150 sec. Enough furnish was treated to make two 42 PCF (67 kg/m$^3$) density boards at 22×20×0.5 in. (559×508×13 mm) for each binder of Table I. Since a viscosity range of 80-500 cps was required for spray application, the feed tank temperatures and hence spray temperatures were adjusted as shown in Table I to attain suitable viscosities. After binder application, the treated furnish was felted in the sequence of face-core-face, and pressed to a thickness of 0.5 inch (13 mm) and a density of 42 lb/ft$^3$ (67 kg/m$^3$) at a platen temperature of 350° F. (177° C.).

B. Testing of Waferboards

Tests were carried out on the waferboards, and Table I below shows a comparison of board properties for the different binders. The testing was in accordance with ASTM D1037-72, except that the following test sample sizes were utilized.

| TEST | ASTM SIZE | SAMPLE SIZE TESTED |
|---|---|---|
| A. Water Absorption (TS) | 4' × 4' board (1219 mm × 1219 mm board) 12" × 12" (305 mm × 305 mm) | 2' × 2' board (610 mm × 610 mm board) 6" × 6" (152 mm × 152 mm) |
| B. Static Bending (MOR) | 3" × 24 times thickness (76 mm × 24 times thickness) | 3" × 13" (76 mm × 330 mm) |
| C. 2 hr. Water Boil & Bending* | 3" × 24 times thickness (76 mm × 24 times thickness) | 3" × 13" (76 mm × 330 mm) |
| D. Internal Bond (IB) | 2" × 2" (51 mm × 51 mm) | 2" × 2" (51 mm × 51 mm) |

*This bending test was performed immediately on hot and totally soaked specimens to achieve maximum harshness of the test method.

While use of the binder composition results in exem-

TABLE I

Polyester vs. Polyether Polyols in Urethane Bonded Waferboard

| Polyol Type | Binder Index | Polyol | | | | Waferboard Strength | | | Waferboard Thickness Swell, % | |
|---|---|---|---|---|---|---|---|---|---|---|
| | | Functionality | Eq. Wt. | Viscosity at Room Temp., cps | Spray Temp °F. (°C.) | MOR, psi (MPa) | IB, psi (kPa) | Wet MOR Ret., % | 2 Hr. Boil | 24 Hr. Soak |
| Polyester Polyol 1[1] | 4.74 | 2.1–2.3 | 210 | 20,000 | 190 | 3977 | 57 ± 5 | 45% | 48% | 29% |

TABLE I-continued

Polyester vs. Polyether Polyols in Urethane Bonded Waferboard

| Polyol Type | Binder Index | Polyol Functionality | Polyol Eq. Wt. | Polyol Viscosity at Room Temp., cps | Spray Temp °F. (°C.) | Waferboard Strength MOR, psi (MPa) | Waferboard Strength IB, psi (kPa) | Wet MOR Ret., % | Waferboard Thickness Swell, % 2 Hr. Boil | Waferboard Thickness Swell, % 24 Hr. Soak |
|---|---|---|---|---|---|---|---|---|---|---|
| Polypropylene Glycol[2] | 4.78 | 2 | 212 | 90 | 70 (21) | 2864 (19.8) | (393 ± 35) 47 ± 1 (324 ± 7) | 42% | 64% | 46% |
| Polyester Polyol 2[3] | 4.59 | 2 | 204 | 8,750 | 160 (71) | 3931 (27.1) | 59 ± 11 (407 ± 76) | 37% | 42% | 33% |
| Polyethylene Glycol[4] | 4.62 | 2 | 205 | 80 | 70 (21) | 4040 (27.9) | 47 ± 1 (324 ± 7) | 31% | 60% | 39% |
| None[5] | ∞ | 100% Mondur MR | 133 | 200 | 100 (38) | 4218 (29.1) | 53 ± 7 (365 ± 48) | 25% | 58% | 36% |

Footnotes:
1. Polyol=reaction product of dimethyl terephthalate residue and diethylene glycol containing 10% diethylene glycol and prepared according to U.S. Pat. No. 4,411,949.
2. PPG-425 available from Dow Chemical.
3. Polyol=reaction product of polyethylene terephthalate, phthalic anhydride and diethylene glycol containing 6% diethylene glycol and prepared according to U.S. Patent Application No. 756,107.
4. PEG-400 available from Union Carbide.
5. Binder=100% Mondur MR.

C. Discussion of Results
a. MOR Results

As shown in Table I, both polyester polyols and PEG-400 gave similar MOR values whereas PPG-425 was about 30% lower, illustrating the usefulness of primary hydroxyl groups in the polyol. Wet MOR retention was excellent for the polyester polyols as shown in Table I. In general, % MOR retention shows an inverse relation to the initial MOR: a low initial MOR yields a high % MOR retention and vice versa. On this basis, the 37 and 45% retention values for the polyester polyols are better than the 42% retention for PPG-425 because of the low initial MOR, 2864 psi (19.7 MPa), for the latter.

b. Internal Bond Results

The polyester polyols yielded higher IB values as compared to the polyether polyols.

c. Dimensional Stability Results

The polyester polyols performed better than the polyether polyols in dimensional stability tests as determined by % thickness swell. In addition, the polyester polyols showed less thickness swell than the 100% Mondur MR control. Thickness swell after 24 hr. soak represents one of the critical tests for waferboard. Whereas a phenol-formaldehyde binder requires slack wax to provide adequate dimensional stability, some waferboard manufacturing operations using 100% isocyanate as binder do not add wax because the composite can survive the dimensional stability tests. Therefore, the present invention provides a relatively inexpensive diluent for isocyanate without sacrificing the board's dimensional stability by the substitution.

EXAMPLE 2

This example illustrates the production of particleboards using as the binder the polyisocyanate/polyol compositions of the following Table II. All binder compositions of the table consist of Mondur MR:polyol in the weight ratios shown in the table.

Planer shavings were treated with the binders at the levels and in the sequence presented in Table II. The treated furnish was compression molded at 650 to 120 psi (4482 to 827 kPa) pressure and a temperature of about 350° F. (177° C.) between stainless steel platens without any evidence of sticking to produce boards having a density of 42-48 pcf (67-77 kg/m³). Testing of the boards for static bending and internal bond strength was carried out as described in Example 1. The overall results shown in the table demonstrate the superiority of the polyester polyol over the polyether polyol as a reactive diluent for isocyanates in the production of particleboard.

TABLE II

Polyester vs. Polyether Polyols in Urethane Bonded Particleboard

| Polyol Type | Total Binder Level, % | Mondur MR/Polyol Weight Ratio % | Binder Addition Sequence | Particleboard Strength MOR psi | Particleboard Strength MOR MPa | Particleboard Strength IB psi | Particleboard Strength IB kPa |
|---|---|---|---|---|---|---|---|
| Polyester Polyol[1] | 2.75 | 75/25 | Polyol 1st | 2195 | 15.1 | 113 | 779 |
| Polyether Polyol[2] | " | " | " | 2262 | 15.6 | 110 | 758 |
| Polyester Polyol[1] | 3.00 | 70/30 | " | 2310 | 15.9 | 121 | 834 |
| Polyether Polyol[2] | " | " | " | 2262 | 15.6 | 97 | 669 |
| Polyester Polyol[1] | 2.75 | 60/40 | " | 1997 | 13.8 | 68 | 469 |
| Polyether Polyol[2] | " | " | " | 1843 | 12.7 | 55 | 379 |
| Polyester Polyol[1] | 2.75 | 75/25 | " | 1523 | 10.5 | 87 | 600 |
| Polyether Polyol[2] | " | " | " | 967 | 6.7 | 55 | 379 |
| Polyester Polyol[1] | 2.75 | 75/25 | Mondur MR 1st | 1526 | 10.5 | 134 | 924 |

TABLE II-continued

Polyester vs. Polyether Polyols in Urethane Bonded Particleboard

| | Binder Level | | | Particleboard Strength | | | |
| | Total | Mondur MR/Polyol | Binder | MOR | | IB | |
| Polyol Type | Binder Level, % | Weight Ratio % | Addition Sequence | psi | MPa | psi | kPa |
|---|---|---|---|---|---|---|---|
| Polyether Polyol[2] | " | " | " | 1577 | 10.9 | 95 | 655 |

[1]Polyol = reaction product of dimethyl terephthalate residue and diethylene glycol having a equivalent weight of 175 and containing 14% diethylene glycol and prepared according to U.S. Pat. No. 4,411,949.
[2]Propoxylated pentaerythritol having an equivalent weight of 101 and available from BASF Wyandotte Chemical Corp. under the trade designation Pluracol ® PEP-450.

EXAMPLE 3

This example illustrates the production of particleboards using the binders of the following Table III.

Planer shavings were treated with the binders at the levels presented in Table III, with the polyols of the polyisocyanate/polyol binders being applied first. 48 pcf (77 kg/m³) boards were produced from the treated furnish in the manner described in Example 2. Testing of the boards for strength was carried out as described in Example 1. The overall results shown in Table III demonstrate the superiority of the polyester polyols over the polyether polyols as reactive diluents for isocyanates in the production of particleboard.

TABLE III

Polyester vs. Polyether Polyols in Urethane Bonded Particleboard

| | | Binder Level | | Polyol | | Particleboard Strength | | | |
| | Binder | Total | Mondur MR | | Eq. | MOR | | IB | |
| Polyol Type | Index | Mondur MR/Polyol, % | Level, % | Functionality | Wt. | psi | MPa | psi | kPa |
|---|---|---|---|---|---|---|---|---|---|
| Polyester Polyol[1] | 3.95 | 2.75 | 2.0 | 2.0 | 175 | 2335 | 16.1 | 110 | 758 |
| Polyester Polyol[2] | 3.3 | " | " | " | 140 | 2425 | 16.7 | 126 | 867 |
| Polyether Polyol[3] | 3.27 | " | " | 2.5 | 145 | 1997 | 13.8 | 85 | 586 |
| Polyether Polyol[4] | 2.28 | " | " | 3.5 | 101 | 2262 | 15.6 | 110 | 758 |
| Polyether Polyol[4] | 1.86 | 3.0 | " | " | " | 2324 | 16.0 | 97 | 669 |
| None[5] | ∞ | 2.75 | 100% Mondur MR 2.75 | | | 2192 | 15.1 | 129 | 889 |

[1]Polyol = reaction product of polyethylene terephthalate and diethylene glycol containing 12% diethylene glycol and prepared according to U.S. Pat. Application No. 756,107.
[2]Polyol = reaction product of dimethyl terephthalate residue and diethylene glycol having an equivalent weight of 140 and containing 27% diethylene glycol and prepared according to U.S. Pat. No. 4,411,949.
[3]Propoxylated trimethylolpropane available from BASF Wyandotte Chemical Corp. under the trade designation Pluracol ® TP-440.
[4]Propoxylated pentaerythritol available from BASF Wyandotte Chemical Corp. under the trade designation Pluracol ® PEP-450.
[5]Binder = 100% Mondur MR.

We claim:

1. In a process for the preparation of a synthetic board wherein cellulosic material is contacted with a binder and the treated material is subsequently formed into boards by the application of heat and pressure, the improvement wherein the binder comprises a polymethylene polyphenyl polyisocyanate and a polyester polyol, with the proviso that the binder does not contain any fatty acid material.

2. The process of claim 1 wherein the polyester polyol comprises an aromatic polyester polyol having a hydroxyl number of about 100 to 700 and an average functionality of about 1 to 8.

3. The process of claim 2, wherein the aromatic polyester polyol comprises
   (a) about 65 to 100% by weight of polyester polyol,
   (b) about 0 to 35% by weight of an alkylene glycol having the formula

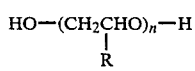

wherein R is a member selected from the group consisting
   of hydrogen and lower alkyl of one to four carbon atoms
   and n is from 1 to 10, and
   (c) about 0 to 35% by weight of at least one other polyol.

4. The process of claim 3 wherein the polyisocyanate is applied to the cellulosic material prior to application of the polyester polyol.

5. The process of claim 3 wherein the equivalent ratio of polyisocyanate to polyol is about 10:1 to 2:1.

6. The process of claim 3 wherein the equivalent ratio of polyester polyol is about 8:1 to 3:1.

7. The process of claim 6 wherein the aromatic polyester polyol comprises the reaction product of at least one primary hydroxyl group-containing alcohol and at least one coreactant selected from the group consisting of (a) estercontaining by-products from the manufacture of dimethyl terephthalate, (b) scrap polyalkylene terephthalates, (c) phthalic anhydride residues, and (d) mixtures thereof.

8. The process of claim 1 wherein the polyester polyol comprises an aromatic polyester polyol having a hydroxyl number of about 100 to 400 and an average functionality of about 2 to 3.

9. The process of claim 8 wherein the aromatic polyester polyol comprises
   (a) about 85 to 100% by weight of polyester polyol, and
   (b) about 0 to 15% by weight of an alkylene glycol having the formula

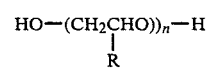

wherein R is a member selected from the group consisting
of hydrogen and lower alkyl of one to four carbon atoms
and n is from 2 to 3.

10. The process of claim 9 wherein the polyisocyanate is applied to the lignocellulosic material prior to application of the aromatic polyester polyol.

11. The process of claim 9 wherein the equivalent ratio of polyisocyanate to polyol is about 10:1 to 2:1.

12. The process of claim 9 wherein the equivalent ratio of polyisocyanate to polyol is about 8:1 to 3:1.

13. The process of claim 12 wherein the aromatic polyester polyol comprises the reaction product of at least one primary hydroxyl group-containing alcohol and at least one coreactant selected from the group consisting of (a) ester-containing by-products from the manufacture of dimethyl terephthalate, (b) scrap polyalkylene terepththalates, (c) phthalic anhydride residues, and (d) mixtures thereof.

14. A synthetic board comprising cellulosic material bonded together with a binder comprising a polymethylene polyphenyl polyisocyanate and a polyester polyol, with the proviso that the binder does not contain any fatty acid material.

15. The synthetic board of claim 14 wherein the cellulosic material is bonded together to form a member selected from the group consisting of a particleboard, a waferboard, an oriented waferboard and an oriented strand board.

16. The synthetic board of claim 14 wherein the polyester polyol comprises an aromatic polyester polyol having a hydroxyl number of about 100 to 700 and an average functionality of about 1 to 8.

17. The synthetic board of claim 16 wherein the aromatic polyester polyol comprises
   (a) about 65 to 100% by weight of polyester polyol,
   (b) about 0 to 35% by weight of an alkylene glycol having the formula

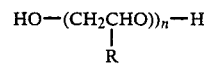

wherein R is a member selected from the group consisting
of hydrogen and lower alkyl of one to four carbon atoms
and n is from 1 to 10, and
   (c) about 0 to 35% by weight of at least one other polyol.

18. The synthetic board of claim 14 wherein the polyester polyol comprises an polyester polyol having a hydroxyl number of about 100 to 400 and an average functionality of about 2 to 3.

19. The synthetic board of claim 18 wherein the aromatic polyester polyol comprises
   (a) about 85 to 100% by weight of polyester polyol, and
   (b) about 0 to 15% by weight of an alkylene glycol having the formula

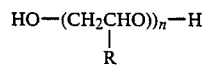

wherein R is a member selected from the group consisting
of hydrogen and lower alkyl of one to four carbon atoms
and n is from 2 to 3.

20. In a multilayered synthetic board comprising cellulosic material bonded together with an adhesive resin, the improvement wherein the core of the board is bonded together with the binder of claim 1.

21. A binder composition for cellulosic material comprising an organic polyisocyanate and an aromatic polyester polyol having a hydroxyl number of about 100 to 700 and an average functionality of about 1 to 8, the equivalent ratio of polyisocyanate to polyol being about 10:1 to 2:1, with the proviso that the binder composition does not contain any fatty acid material.

* * * * *